United States Patent
Oshima (10) Patent No.: US 6,961,651 B2
(45) Date of Patent: Nov. 1, 2005

(54) COMMON RAIL FUEL INJECTION DEVICE

(75) Inventor: Kazuhiko Oshima, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/878,510

(22) Filed: Jun. 29, 2004

(65) Prior Publication Data

US 2005/0005909 A1 Jan. 13, 2005

(30) Foreign Application Priority Data

Jul. 9, 2003 (JP) .................................... 2003-272499

(51) Int. Cl.[7] .......................... F02D 13/04; F02D 41/04
(52) U.S. Cl. ..................................... 701/104; 123/456
(58) Field of Search .......................... 701/104; 123/456, 123/479, 480, 486, 446

(56) References Cited

U.S. PATENT DOCUMENTS 5,690,073 A * 11/1997 Fuwa ........................ 123/443
5,950,598 A * 9/1999 Wenzlawski et al. ....... 123/486

FOREIGN PATENT DOCUMENTS

JP          2002-155783          5/2002

* cited by examiner

*Primary Examiner*—Hieu T. Vo
(74) *Attorney, Agent, or Firm*—Nixon & Vanderhye P.C.

(57) ABSTRACT

In fuel injection control, an injection pattern is determined by reading, from memory, an injection pattern appropriate to a current engine speed, desired torque, and a common rail pressure. Therefore, it is possible to form "an injection pattern for obtaining an appropriate combustion state," irrespective of response delay in the common rail pressure. Since the injection pattern appropriate to the current engine speed, the desired torque, and the common rail pressure is read from the memory, data to create "an injection pattern for obtaining an appropriate combustion state" is taken in a one-step process of "map read." Therefore, it is possible to reduce the calculation load, which is necessary for the injection control.

9 Claims, 9 Drawing Sheets

FIG. 1A OPTIMAL INJECTION PATTERN DURING REGULAR STATE

FIG. 1B INJECTION PATTERN AT LOW PRESSURE ACCORDING TO CONVENTIONAL CONTROL

FIG. 1C INJECTION PATTERN AT LOW PRESSURE ACCORDING TO THE PRESENT INVENTION

COMMON RAIL FUEL INJECTION DEVICE

CROSS REFERENCE TO RELATED APPLICATION

This application is based upon, claims the benefit of priority of, and incorporates by reference Japanese Patent Application No. 2003-272499 filed Jul. 9, 2003.

BACKGROUND OF THE INVENTION

1. Field of the Invention

The present invention relates to a common rail fuel injection device, and in particular, to control for determining an injection pattern for injecting fuel from an injector.

The injection pattern is composed of a plurality of injection factors, such as an injection quantity, injection timing, injection duration, the number of injections, an injection interval, a common rail pressure, and the like.

2. Description of the Related Art

In conventional control for determining an injection pattern, an ECU (an engine control unit) stores an injection quantity, injection start timing, the number of injections, and the like, which correspond to the information of an engine speed and engine desired torque (hereinafter called "desired torque"), as a compatible value. Herein, the desired torque is a desired value of engine power, which is calculated from a power index desired by a driver. A common rail fuel injection device is controlled by use of the following procedure so that the foregoing map data corresponds with an operating state.

Figure 1A:
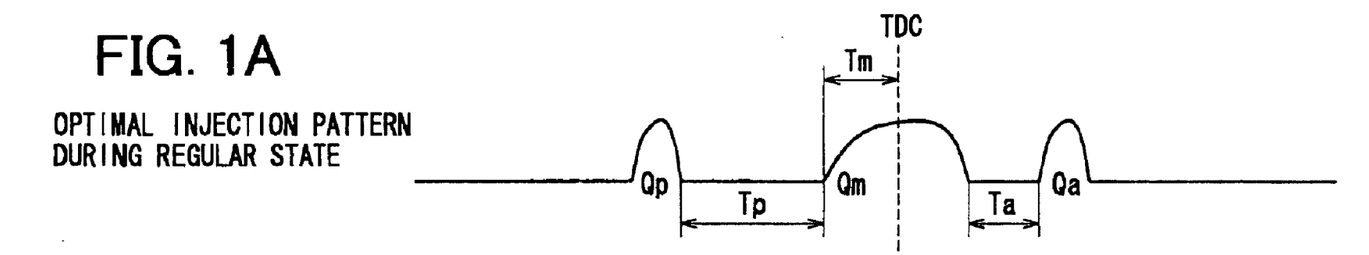
FIGS. 1A–1C are explanatory views of injection patterns according to a first embodiment of the present invention.

In the conventional technology, by way of example, a common rail desired pressure PFIN (target pressure) is calculated, in addition to a pre-injection quantity Qp, a pre-interval Tp, main-injection start timing Tm, a main-injection quantity Qm, an after interval Ta, and an after-injection quantity Qa, as injection factors of the injection pattern, as shown in FIG. 1A.

Figure 8:
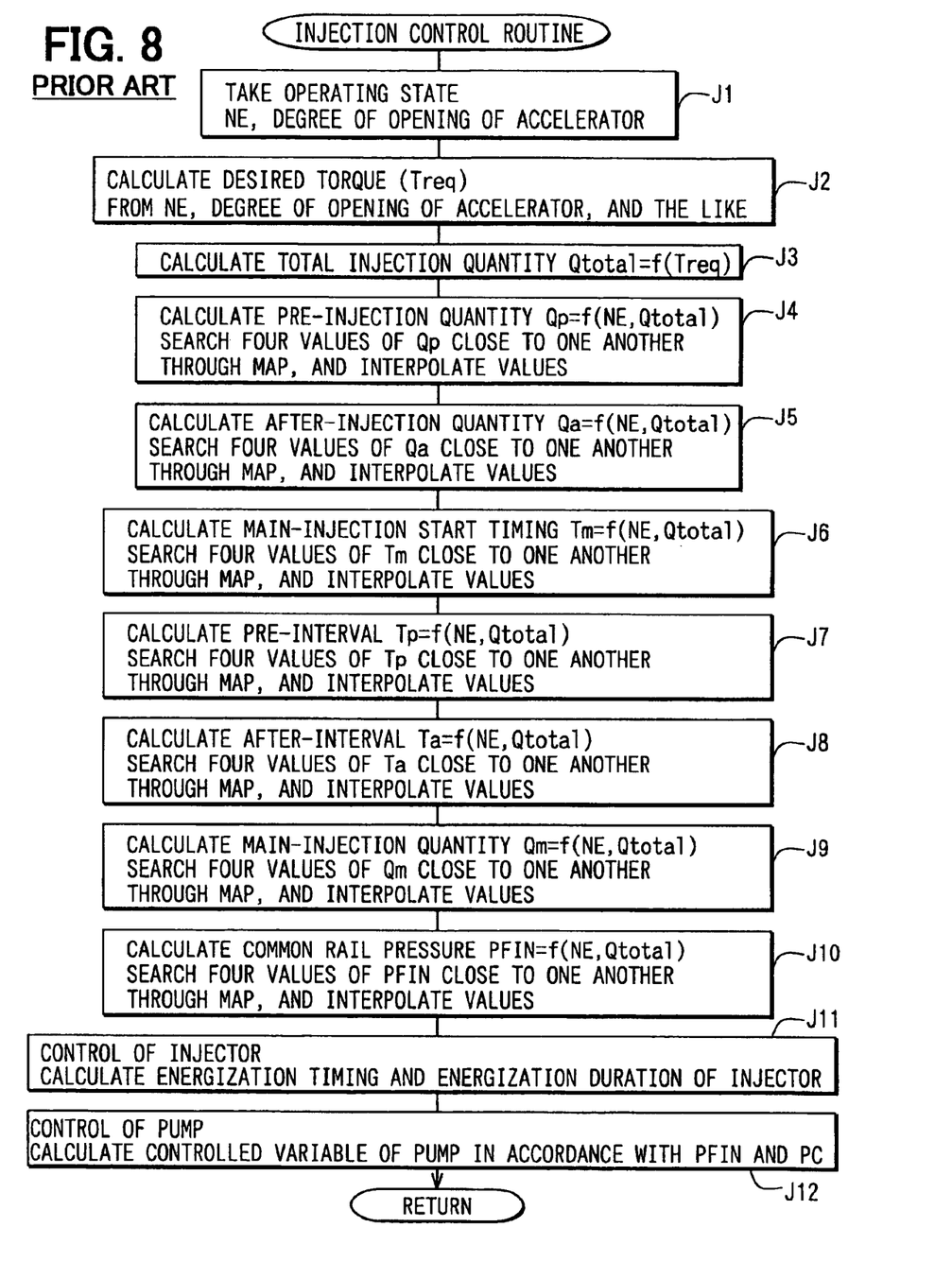
FIG. 8 is a flowchart of injection control according to a prior art example.

A conventional control unit calculates a total injection quantity Qtotal on the basis of desired torque and an engine speed NE, and then individually calculates each injection factor (Qp, Tp, Tm, Qm, Ta, Qa, and PFIN) on the basis of the total injection quantity Qtotal and the engine speed NE. A conventional procedure for obtaining an injection pattern will be described with reference to the flowchart of FIG. 8 and a block diagram of FIG. 9.

Upon entering an injection control routine for obtaining an injection pattern (start), an operating state such as an engine speed NE, the degree of opening of an accelerator, and like is read in (step J1). Then, desired torque Treq is calculated from the engine speed NE, the degree of opening of the accelerator, and the like (step J2). Next, a total injection quantity Qtotal appropriate to the current engine speed NE and the desired torque Treq is read from memory, which stores various injection factor patterns based on the engine speed NE and the desired torque Treq (step J3).

Figure 9:
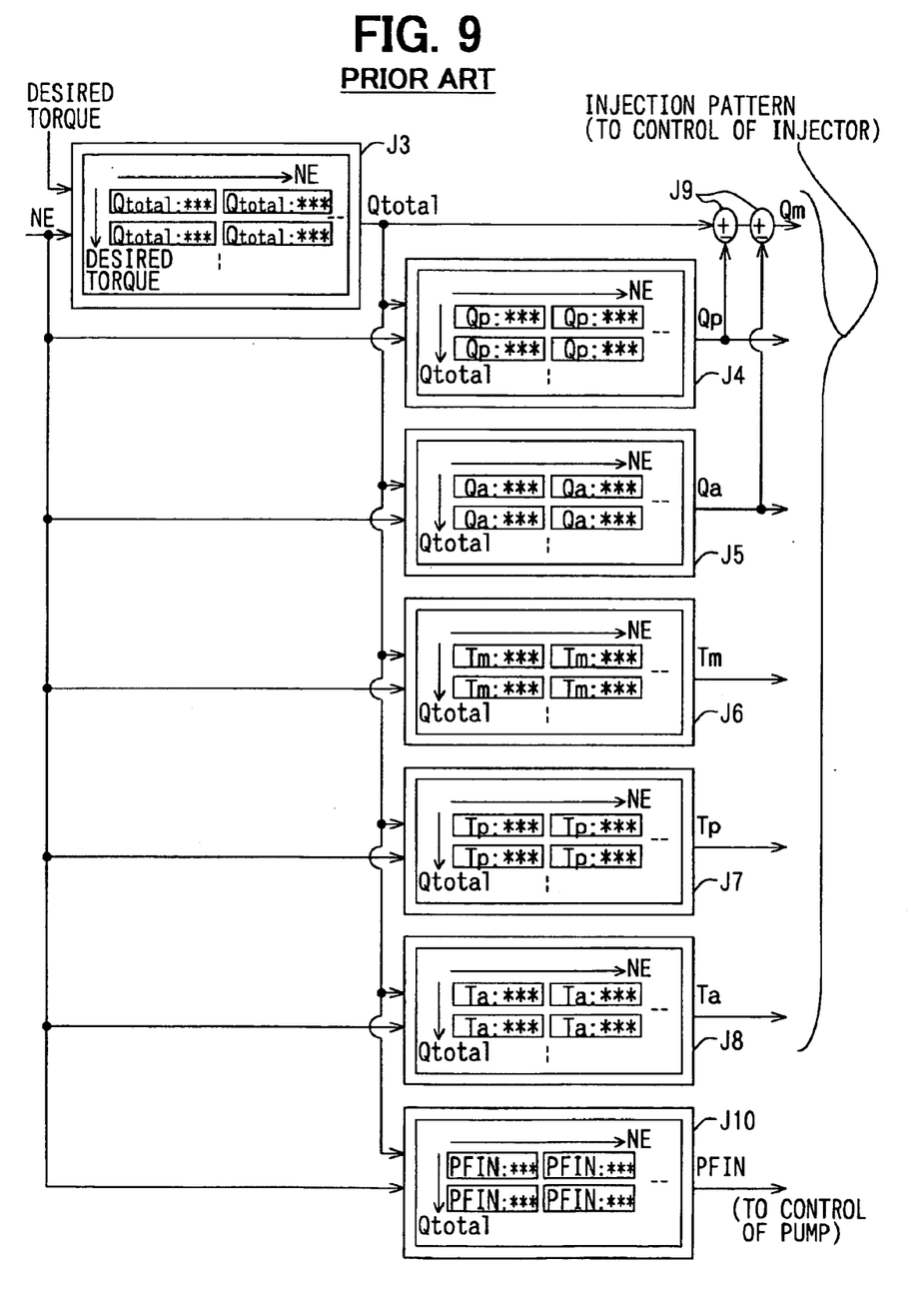
FIG. 9 is a block diagram of the injection control of the prior art example.

In step J3, as shown in FIG. 9, four values of the total injection quantity Qtotal close to one another are searched through a map, appropriate to the current engine speed NE and the desired torque Treq. By interpolating the searched four values of the total injection quantity Qtotal with respect to four points, the total injection quantity Qtotal suited for the current engine speed NE and the desired torque Treq is calculated.

Then, a pre-injection quantity Qp appropriate to the current engine speed NE and the total injection quantity Qtotal is read from memory, which stores various injection factor patterns based on the engine speed NE and the total injection quantity Qtotal (step J4).

In step J4, as shown in FIG. 9, four values of the pre-injection quantity Qp close to one another are searched through a map, appropriate to the current engine speed NE and the total injection quantity Qtotal. By interpolating the searched four values of the pre-injection quantity Qp with respect to four points, the pre-injection quantity Qp suited for the current engine speed NE and the total injection quantity Qtotal is calculated.

Then, an after-injection quantity Qa appropriate to the current engine speed NE and the total injection quantity Qtotal is read from memory, which stores various injection factor patterns based on the engine speed NE and the total injection quantity Qtotal (step J5).

In step J5, as shown in FIG. 9, four values of the after-injection quantity Qa close to one another are searched through a map, appropriate to the current engine speed NE and the total injection quantity Qtotal. By interpolating the searched four values of the after-injection quantity Qa with respect to four points, the after-injection quantity Qa suited for the current engine speed NE and the total injection quantity Qtotal is calculated.

Then, a main injection start timing Tm appropriate to the current engine speed NE and the total injection quantity Qtotal is read from memory, which stores various injection factor patterns based on the engine speed NE and the total injection quantity Qtotal (step J6).

In step J6, as shown in FIG. 9, four values of the main-injection start timing Tm close to one another are searched through a map, appropriate to the current engine speed NE and the total injection quantity Qtotal. By interpolating the searched four values of the main injection start timing Tm with respect to four points, the main injection start timing Tm suited for the current engine speed NE and the total injection quantity Qtotal is calculated.

Then, pre-intervals Tp appropriate to the current engine speed NE and the total injection quantity Qtotal are read from memory, which stores various injection factor patterns based on the engine speed NE and the total injection quantity Qtotal (step J7).

In step J7, as shown in FIG. 9, the four pre-intervals Tp close to one another are searched through a map, appropriate to the current engine speed NE and the total injection quantity Qtotal. By interpolating the searched four pre-intervals Tp with respect to four points, the pre-interval Tp suited for the current engine speed NE and the total injection quantity Qtotal is calculated. Then, after-intervals Ta appropriate to the current engine speed NE and the total injection quantity Qtotal are read from memory, which stores various injection factor patterns based on the engine speed NE and the total injection quantity Qtotal (step J8).

In step J8, as shown in FIG. 9, the four after-intervals Ta close to one another are searched through a map appropriate to the current engine speed NE and the total injection quantity Qtotal. By interpolating the searched four after-intervals Ta with respect to four points, the after-interval Ta suited for the current engine speed NE and the total injection quantity Qtotal is calculated. Then, a main-injection quantity Qm appropriate to the current engine speed NE and the total injection quantity Qtotal is read from memory, which stores various injection factor patterns based on the engine speed NE and the total injection quantity Qtotal (step J9).

In step J9, as shown in FIG. 9, the main-injection quantity Qm may be calculated by subtracting the pre-injection quantity Qp and the after-injection quantity Qa calculated in steps J4 and J5, respectively, from the total injection quantity Qtotal calculated in step J3. Then, a common rail desired pressure PFIN appropriate to the current engine speed NE and the total injection quantity Qtotal is read from memory, which stores various injection factor patterns based on the engine speed NE and the total injection quantity Qtotal (step J10).

In step J10, as shown in FIG. 9, four values of the common rail desired pressure PFIN close to one another are searched through a map appropriate to the current engine speed NE and the total injection quantity Qtotal. By interpolating the searched four values of the common rail desired pressure PFIN with respect to four points, the common rail desired pressure PFIN suited for the current engine speed NE and the total injection quantity Qtotal is calculated.

Then, an injector is controlled on the basis of each injection factor (Qp, Tp, Tm, Qm, Ta, and Qa) calculated in each of steps J4 to J9 (step J11). Then, the discharge rate of a supply pump is controlled on the basis of the injector factor (the common rail desired pressure PFIN) calculated in step J10 and the current common rail pressure (step J12), and operation returns. Operation shown in the foregoing injection control routine is repeated injection-by-injection (refer to, for example, Japanese Patent Laid-Open Publication No. 2002-155783).

The conventional common rail fuel injection device gives excellent control ability for an engine, because the common rail fuel injection device can freely set each injection factor (injection quantity, injection timing, injection duration, the number of injections, interval, common rail pressure, and the like) of the injection pattern. In the common rail fuel injection device, optimal common rail pressure differs in accordance with the operating state of the engine. Therefore, when the operating state of the engine varies, it is necessary to make the common rail pressure follow the optimal pressure.

The pressure-rising response of the common rail pressure depends on the discharge rate of the supply pump, an amount of fuel consumption of the injector, and the like. The pressure-lowering response of the common rail pressure depends on an amount of overflow from a common rail to a fuel tank due to a pressure-reducing valve and the like, an amount of fuel consumption of the injector, and the like. Thus, there are limits to the pressure-rising response and the pressure-lowering response of the common rail pressure. Thus, delay in the response of the common rail pressure makes the injection pattern inappropriate.

Figure 1B:
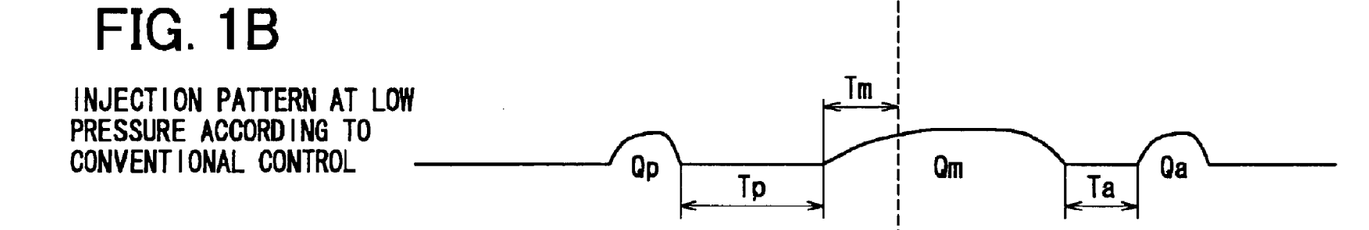

An example will be described. In the case of full-throttle acceleration, it is desired to carry out injection with an injection pattern (refer to FIG. 1A) which corresponds to a common rail at high pressure. In the case of the full-throttle acceleration from idle, however, there is response delay in actual common rail pressure and hence the injection duration becomes long, as shown in FIG. 1B. Thus, since the terminal point of main injection shifts on the retarded side, emission and fuel efficiency become worse.

Japanese Patent Laid-Open Publication No. 2002-155783 mentioned above discloses a control technology for correcting injection timing in accordance with the common rail pressure. Of a plurality of the injection factors constituting the injection pattern, the invention of Japanese Patent Laid-Open Publication No. 2002-155783 can correct only the injection timing, but cannot optimize the other injection factors (injection quantity, injection duration, the number of injections, interval, common rail pressure, and the like).

In the conventional control for determining an injection pattern, as described above, each injection factor is individually determined. In each process for determining each injection factor, four values of the injection factor close to one another are searched through a map, appropriate to a current operating state. Then, the four searched values are interpolated with respect to four points, in order to calculate the injection factor suited for the current operating state of the engine. Therefore, a calculation load in the injection control, which requires high-speed calculation, becomes heavy.

SUMMARY OF THE INVENTION

In view of the foregoing problems, an object of the present invention is to provide a common rail fuel injection device that (1) can create "an injection pattern for obtaining an appropriate combustion state" irrespective of the transitional response performance of the common rail pressure, and (2) can take data to create "an injection pattern for obtaining an appropriate combustion state" in a one-step process of reading a map, in order to reduce a calculation load.

According to a first aspect of the present invention, a common rail fuel injection device reads an injection pattern (a set of data of injection factors composing the injection pattern), which is appropriate to a current engine speed, a current desired value of engine power, and a current common rail pressure, from memory, and carries out the read injection pattern. Since the injection pattern appropriate to the inputted information of the current engine speed, the desired value of engine power, and the common rail pressure is read, and fuel injection is carried out in accordance with the injection pattern, it is possible to form "an injection pattern for obtaining an appropriate combustion state," irrespective of the transitional response performance of the common rail pressure.

The injection pattern appropriate to the current engine speed, the desired value of engine power, and the common rail pressure is read from the memory, and it is possible to take data in a one-step process of reading a map to create "an injection pattern for obtaining an appropriate combustion state." Therefore, it is possible to reduce a calculation load in a control unit.

According to a second aspect of the present invention, the common rail fuel injection device reads an injection pattern, which is appropriate to a current engine speed, a current desired value of engine power, a current common rail pressure, and a current temperature in a cylinder, from memory, and carries out the read injection pattern. Since the injection pattern appropriate to the temperature in the cylinder, in addition to the current engine speed, the desired value of engine power, and the common rail pressure, is formed, it is possible to obtain the optimal injection pattern.

According to a third aspect of the present invention, the common rail fuel injection device reads an injection pattern, which is appropriate to a current engine speed, a current desired value of engine power, a current common rail pressure, and a current air quantity in a cylinder, from memory, and carries out the read injection pattern. Since the injection pattern appropriate to the air quantity in the cylinder, in addition to the current engine speed, the desired value of engine power, and the common rail pressure, is formed, it is possible to obtain the optimal injection pattern.

According to a fourth aspect of the present invention, the common rail fuel injection device reads an injection pattern, which is appropriate to a current engine speed, a current desired value of engine power, a current common rail pressure, a current temperature in a cylinder, and a current air quantity in the cylinder, from memory, and carries out the read injection pattern. Since the injection pattern appropriate to the temperature and the air quantity in the cylinder, in addition to the current engine speed, the desired value of engine power, and the common rail pressure, is formed, it is possible to obtain the optimal injection pattern.

According to a fifth aspect of the present invention, when interpolating a plurality of the injection factors for composing the injection pattern on the basis of a current operating state, the common rail fuel injection device first calculates a single interpolation coefficient, and then interpolates the plurality of injection factors with the use of the interpolation coefficient at that time. Calculating the single interpolation coefficient, and interpolating the plurality of injection factors with the use of the interpolation coefficient, as described above, make it possible to reduce a calculation load in interpolation.

According to a sixth aspect of the present invention, in the common rail fuel injection device, the desired value of engine power is an index value for indicating a desired level of engine power. Furthermore, the desired value of engine power is any one of engine desired torque, a desired injection quantity, and a power index value for indicating a level of power desired by a driver.

According to a seventh aspect of the present invention, when the desired value of engine power cannot be obtained by carrying out an injection pattern, because the common rail pressure in the injection pattern is inappropriate to the desired value of engine power, the common rail fuel injection device informs a driver that actual engine power does not satisfy the desired value of engine power. Otherwise the common rail fuel injection device outputs a signal to other control units, the signal indicating that actual engine power does not satisfy the desired value of engine power. Since the driver can know that the desired value of engine power cannot be obtained, it is possible to relieve a sense of discomfort, due to the nonattainment of the desired value of engine power. When there are other control systems, the other control systems know that the desired value of engine power cannot be obtained according to this aspect. Thus, the other control systems can take measures against the nonattainment of the desired value of engine power.

According to an eighth aspect of the present invention, the common rail fuel injection device uses an injection pressure of an injector, instead of the common rail pressure. To detect the injection pressure of the injector, the upstream pressure of a nozzle seat of the injector may be directly detected by a sensor. Otherwise, the injection pressure of the injector may be estimated from the common rail pressure and the like.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the best mode of the present invention, an injection pattern appropriate to a current engine speed, a desired value of engine power, and a common rail pressure is read from memory, and the read injection pattern is carried out. The injection pattern is a set of data of injection factors, which composes the injection pattern. The desired value of engine power is an index value indicating a desired level of engine power, such as desired torque, a desired injection quantity, and a power index value desired by a driver.

[First Embodiment]

A first embodiment will be described with reference to FIGS. 1 to 4. First, the configuration of a common rail fuel injection device according to the present invention will be described with reference to FIG. 4. The common rail fuel injection device for injecting fuel into each cylinder of an engine (for example, a diesel engine) has a common rail 1, injectors 2, a supply pump 3, an ECU 4 (an engine control unit: corresponds to a control unit), an EDU 5 (a drive unit), and the like.

Figure 4:
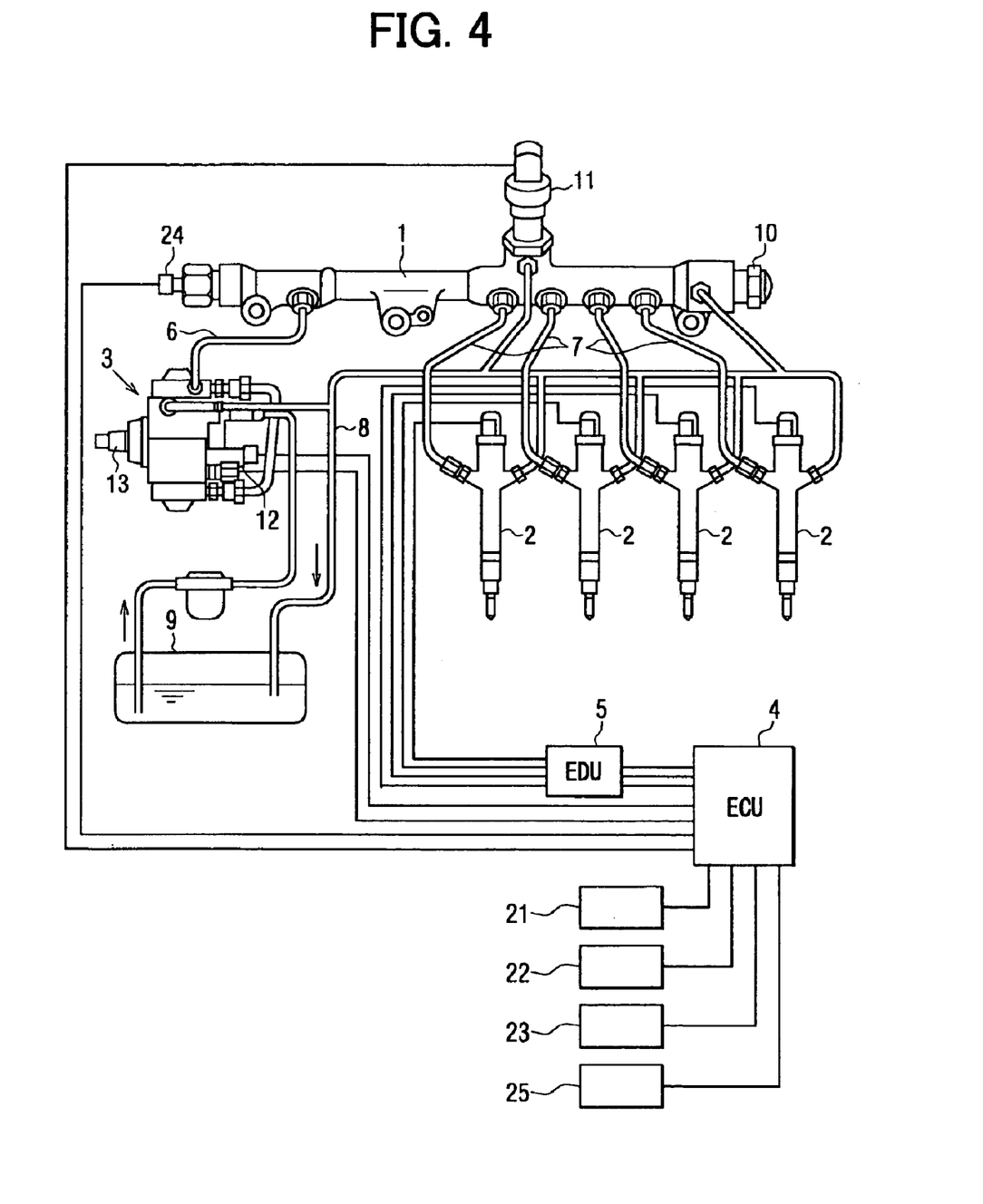
FIG. 4 is a schematic diagram of a common rail fuel injection device according to the first embodiment of the present invention.

The common rail 1 is an accumulator for accumulating fuel at high pressure, which is supplied to the injectors 2. The common rail 1 is connected to a discharge port of the supply pump 3, which pressurizes and pumps fuel at high pressure through a high-pressure pump pipe 6, in such a manner as to accumulate a common rail pressure therein corresponding to a fuel injection pressure. The common rail 1 is also connected to a plurality of injector pipes 7, which supply fuel at high pressure to the respective injectors 2. Leakage fuel from the injector 2 and leakage fuel from the supply pump 3 are returned to a fuel tank 9 through a leakage pipe 8.

The common rail 1 is provided with a pressure limiter 10. The pressure limiter 10 as a pressure relief valve is open, when the fuel pressure in the common rail 1 exceeds a predetermined limit pressure. At this time, part of the fuel in the common rail 1 is returned to the fuel tank 9 through the leakage pipe 8, in order to hold the fuel pressure in the common rail 1 equal to or less than a predetermined limit pressure.

The common rail 1 is also provided with a pressure reducing valve 11. The pressure reducing valve 11 opens in response to a valve opening command signal supplied by the ECU 4, so that the fuel at high pressure in the common rail 1 overflows through the leakage pipe 8, to reduce the common rail pressure. The injector 2, provided for each cylinder of the engine, supplies fuel into each cylinder by injection. The injector 2 is connected to a downstream end of each of the plurality of injector pipes 7, which branch from the common rail 1. The injector 2 has a fuel injection nozzle for supplying the fuel at a high pressure, as accumulated in the common rail 1, into each cylinder, an electromagnetic valve for carrying out the lift control of a needle contained in the fuel injection nozzle, and other components.

The supply pump 3 supplies the common rail 1 with fuel compressed at high pressure. The supply pump 3 has a feed pump for drawing fuel from the fuel tank 9, and a high-pressure pump for pressurizing and pumping the fuel, the pressure of which is regulated by a regulator valve and an amount of which is regulated by a fuel control valve (or a suction control valve, SCV) 12, into the common rail 1. The feed pump and the high pressure pump are driven by the rotation of a cam shaft 13. This cam shaft 13 is rotated by a crank shaft of the engine or the like.

The ECU 4 is a computer composed of a CPU, memory (RAM, ROM, backup RAM, or the like), an AD converter, an input port, an output port, and the like, all of which are not shown in the drawings. The ECU 4 is connected to various sensors, to obtain information signals (signals for detecting the operating state of the engine and a vehicle) for calculation. To be more specific, the ECU 4 is connected to an engine speed sensor 21 for detecting an engine speed NE, an accelerator opening sensor 22 for detecting the degree of opening of an accelerator, a coolant temperature sensor 23 for detecting the temperature of coolant of the engine, a common rail pressure sensor 24 for detecting the internal pressure of the common rail 1 (common rail pressure PC), and other sensors 25.

(Features of the First Embodiment)

Various injection patterns based on an engine speed NE, desired torque-Treq, and a common rail pressure PC are stored in the memory of the ECU 4. The injection pattern is composed of a plurality of injection factors, such as an injection quantity, injection timing, injection duration, the number of injections, an interval (an injection interval), a common rail pressure PC, and the like.

Injection control is programmed in the ECU 4 so that the injection pattern appropriate to the current engine speed NE, the desired torque Treq, and the common rail pressure PC is read from the memory, and the read injection pattern is carried out injection-by-injection.

Figure 2:
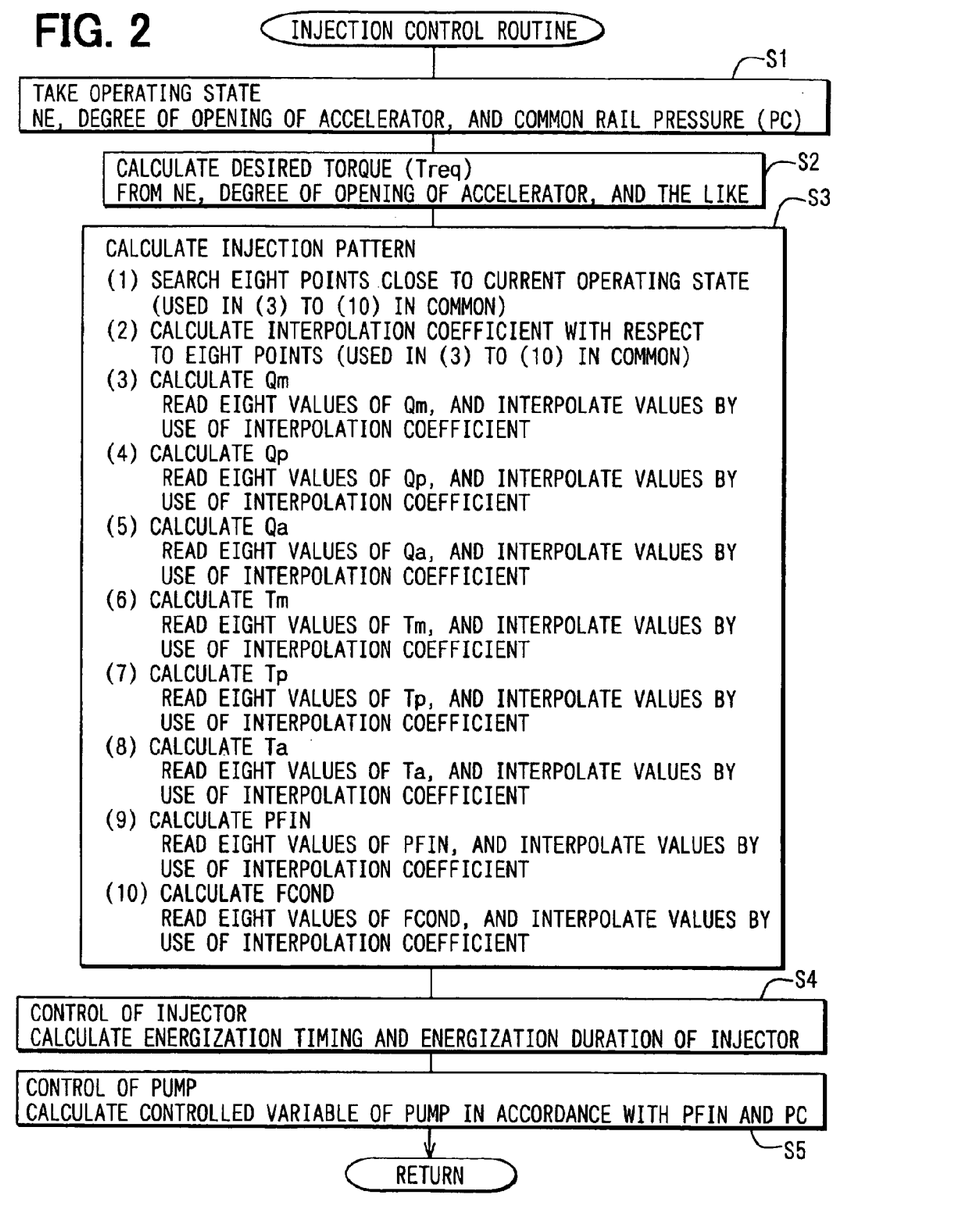
FIG. 2 is a flowchart of injection control according to the first embodiment of the present invention.
Figure 3:
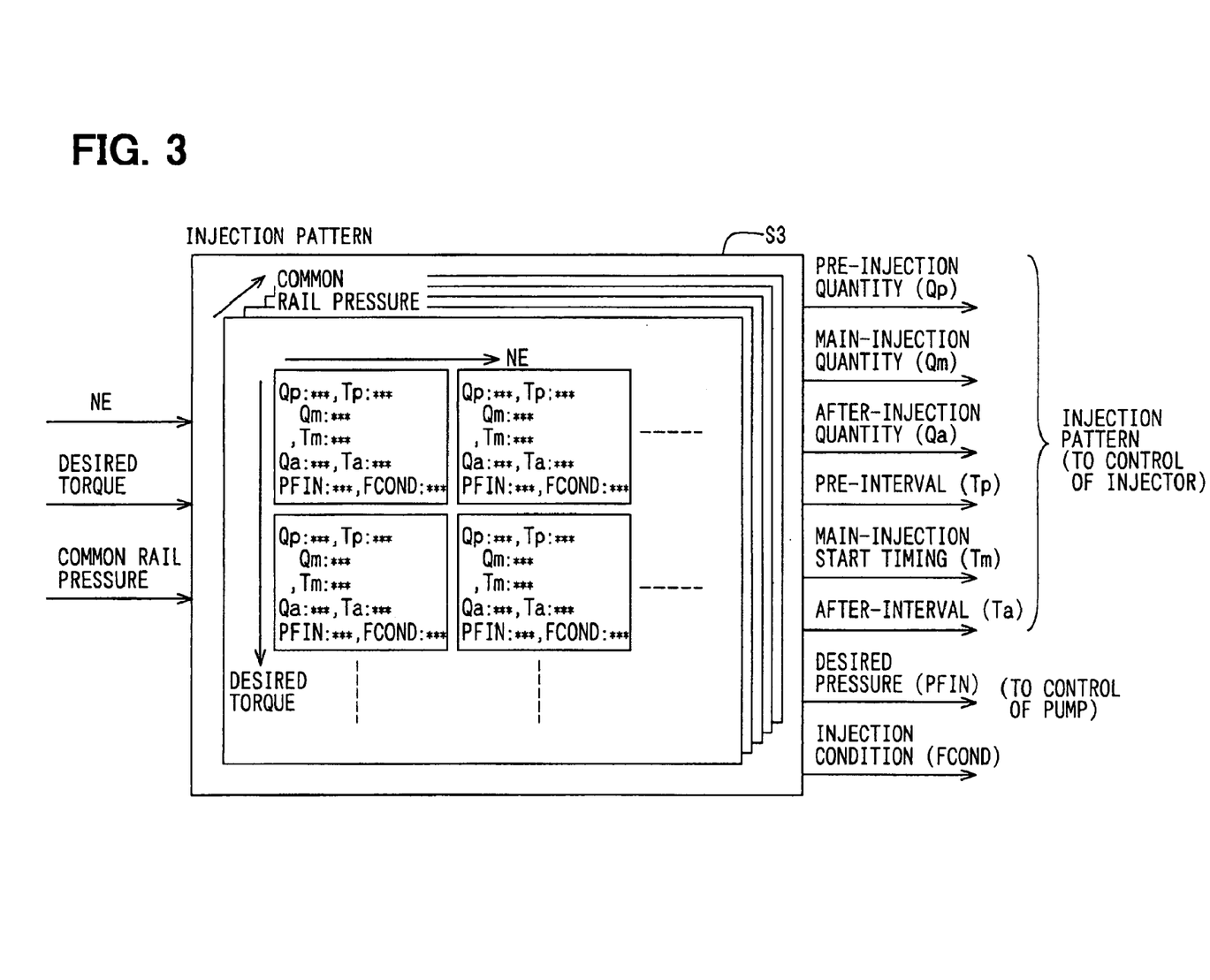
FIG. 3 is a block diagram of the injection control according to the first embodiment of the present invention.

An example of the injection control by the ECU 4 will be described with reference to the flowchart of FIG. 2. Upon entering an injection control routine, which is carried out on a fuel injection basis (start), an operating state such as a current engine speed NE (a value read by the engine speed sensor 21), the degree of opening of the accelerator (a value read by the accelerator opening sensor 22), a common rail pressure PC (a value read by the common rail pressure sensor 24), and like is read in (step S1). Then, desired torque Treq is calculated from the engine speed NE, the degree of opening of the accelerator, and the like (step S2). Next, an injection pattern appropriate to the current engine speed NE, the desired torque Treq, and the common rail pressure PC is calculated (step S3).

In step S3, the following calculation (1) to (10) is carried out.

(1) Eight injection patterns close to the current operating state are searched through a map, by searching two points close to the current engine speed NE, two points close to the current desired torque Treq, and two points close to the current common rail pressure PC.

(2) An interpolation coefficient with respect to eight points is calculated, in order to calculate a point close to the current operating state from the eight points searched in (1) described above.

(3) Eight values of main-injection quantity Qm are read from the eight injection patterns searched in (1) described above. Then, the eight values of the main-injection quantity Qm are interpolated with respect to eight points by use of the interpolation coefficient calculated in (2) described above. Therefore, the main-injection quantity Qm is calculated.

(4) Eight values of pre-injection quantity Qp are read from the eight injection patterns searched in (1) described above. Then, the eight values of the pre-injection quantity Qp are interpolated with respect to eight points by use of the interpolation coefficient calculated in (2) described above. Therefore, the pre-injection quantity Qp is calculated.

(5) Eight values of after-injection quantity Qa are read from the eight injection patterns searched in (1) described above. Then, the eight values of the after-injection quantity Qa are interpolated with respect to eight points by use of the interpolation coefficient calculated in (2) described above. Therefore, the after-injection quantity Qa is calculated.

(6) Eight values of main-injection start timing Tm are read from the eight injection patterns searched in (1) described above. Then, the eight values of the main-injection start timing Tm are interpolated with respect to eight points by use of the interpolation coefficient calculated in (2) described above. Therefore, the main-injection start timing Tm is calculated.

(7) Eight pre-intervals Tp are read from the eight injection patterns searched in (1) described above. Then, the pre-intervals Tp are interpolated with respect to eight points by use of the interpolation coefficient calculated in (2) described above. Therefore, the pre-interval Tp is calculated.

(8) Eight after-intervals Ta are read from the eight injection patterns searched in (1) described above. Then, the after-intervals Ta are interpolated with respect to eight points by use of the interpolation coefficient calculated in (2) described above. Therefore, the after-interval Ta is calculated.

(9) Eight values of common rail desired pressure PFIN are read from the eight injection patterns searched in (1) described above. Then, the eight values of the common rail desired pressure PFIN are interpolated with respect to eight points by use of the interpolation coefficient calculated in (2) described above. Therefore, the common rail desired pressure PFIN is calculated.

(10) Eight desired torque nonattainment values FCOND are read from the eight injection patterns searched in (1) described above. Then, the desired torque nonattainment values FCOND are interpolated with respect to eight points by use of the interpolation coefficient calculated in (2) described above. Therefore, it is judged whether the common rail pressure PC is appropriate to the desired torque Treq, and the desired torque Treq (engine power) can be obtained with the injection pattern or not.

In the first embodiment, when the common rail pressure PC is inappropriate (actual common rail pressure≠common rail desired pressure) due to response delay during a transitional period and the like, and an injection pattern by which the desired torque cannot be obtained is carried out, the common rail fuel injection device informs a driver that "the desired torque cannot be obtained."

To be more specific, when an injection pattern for obtaining torque desired by the driver is carried out, an area, in which emission (for example, particulate and the like) exceeds a predetermined value, exists because the common rail pressure PC (actual pressure) is inappropriate. This area is known in advance.

In the injection control according to the first embodiment, an injection pattern appropriate to the current common rail pressure PC (an injection pattern by which the emission does not become worse) is carried out, not only in a regular period but also in the transitional period. Thus, an injection pattern, by which the desired torque cannot be obtained, is carried out in some area. At this time, whether this is the area where the desired torque cannot be obtained or not is judged on the basis of the value in (10) described above. When it is judged that this is the area where the desired torque cannot be obtained, the common rail fuel injection device informs the driver that "the desired torque cannot be obtained" by use of a visual display means such as a lamp and the like.

Accordingly, since the driver can know that the desired torque cannot be obtained, it is possible to relieve a sense of discomfort of the driver due to the nonattainment of the desired torque.

In the first embodiment, when the desired torque cannot be obtained due to the common rail pressure PC inappropriate to the desired torque, the common rail fuel injection device informs the driver that "the desired torque cannot be obtained." Alternatively, when the desired torque cannot be obtained, a signal for indicating that the desired torque cannot be obtained (a desired torque nonattainment signal) may be outputted to other control systems (for example, a desired torque calculation unit which has indicated the desired torque and the like). Accordingly, since other control systems can know the nonattainment of the desired torque, the other control systems can take measures against the nonattainment of the desired torque.

Then, the injector 2 is controlled on the basis of each injection factor (Qp, Tp, Tm, Qm, Ta, and Qa) obtained in step S3 (step S4).

Then, the discharge rate of the supply pump is controlled so that the current common rail pressure PC converges on the common rail desired pressure PFIN, on the basis of the common rail desired pressure PFIN obtained in step S3 and the current common rail pressure PC (step S5), and then the operation returns. The foregoing control shown in the injection control routine is repeated injection-by-injection.

(Effect of the First Embodiment)

As described in "Description of the Related Art," the actual common rail pressure cannot abruptly increase or decrease due to the response delay. In the conventional injection control, an injection pattern (each injection factor) is determined, on the precondition that the actual common rail pressure has reached the common rail desired pressure. Thus, the response delay in the common rail pressure makes the injection pattern inappropriate.

An example will be described with reference to FIG. 1. In the case of full-throttle acceleration from idle, as shown in FIG. 1A, it is desired to carry out the injection control at the common rail desired pressure (high-pressure). The response of the actual common rail pressure, however, has limits, as described above. Thus, in the injection control according to the prior art, an injection pattern appropriate to the common rail desired pressure (high pressure) is obtained, and the injection pattern is carried out at the actual common rail pressure (low pressure). Since the actual common rail pressure is low, the terminal point of main injection shifts on the retarded side, as shown in FIG. 1B, so that emission and fuel efficiency become worse.

To solve the foregoing problem, in the fuel control according to the first embodiment, an injection pattern appropriate to the common rail pressure (actual pressure) on its way to becoming the common rail desired pressure is carried out.

Figure 1C:
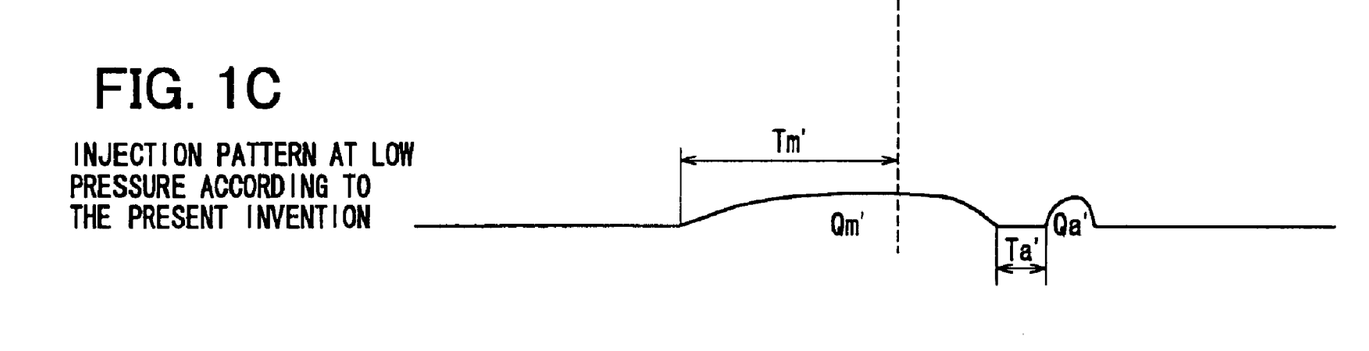

Citing one concrete example, in the case of full-throttle acceleration from idle, as shown in FIG. 1C, an injection pattern appropriate to the common rail pressure (actual pressure) on its way from a low common rail pressure to a high common rail pressure is carried out. In response to the extension of the injection duration at low pressure, the main-injection start timing is advanced to Tm', the main-injection quantity is optimized to Qm', and the pre-injection which becomes unnecessary, is stopped. Accordingly, the start point of the after injection can be optimized to Ta' and the after-injection quantity can be optimized to Qa'. This makes it possible to prevent the deterioration of the emission and the fuel efficiency.

Namely, in the common rail fuel injection device according to the first embodiment, an injection pattern appropriate to the current engine speed, desired torque, and a common rail pressure is obtained. Therefore, it is possible to form "an injection pattern for obtaining an appropriate combustion state," irrespective of the transitional response performance of the common rail pressure.

An injection pattern appropriate to the current engine speed, the desired torque, and the common rail pressure is read from the memory, so that it is possible to take data in a one-step process of "map reading" to create "an injection pattern for obtaining an appropriate combustion state." Therefore, it is possible to reduce a calculation load in the injection control of the ECU 4.

Furthermore, in the common rail fuel injection device according to the first embodiment, when each of the plurality of injection factors is interpolated on the basis of the current operating state, the single interpolation coefficient is first calculated, and then each of the plurality injection factors is interpolated by use of the interpolation coefficient at that time. Calculating the single interpolation coefficient, and interpolating the plurality of injection factors with the use of the interpolation coefficient, as described above, make it possible to reduce the calculation load during interpolation. In other words, using this interpolation method also makes it possible to reduce the calculation load in the injection control of the ECU 4.

[Second Embodiment]

In the foregoing first embodiment, the various injection patterns based on the three factors of engine speed, desired torque, and common rail pressure are stored in the memory of the ECU 4. An injection pattern appropriate to the current engine speed, the desired torque, and the common rail pressure is then read from the memory during the operation of the engine, and the read injection pattern is carried out.

Figure 5:
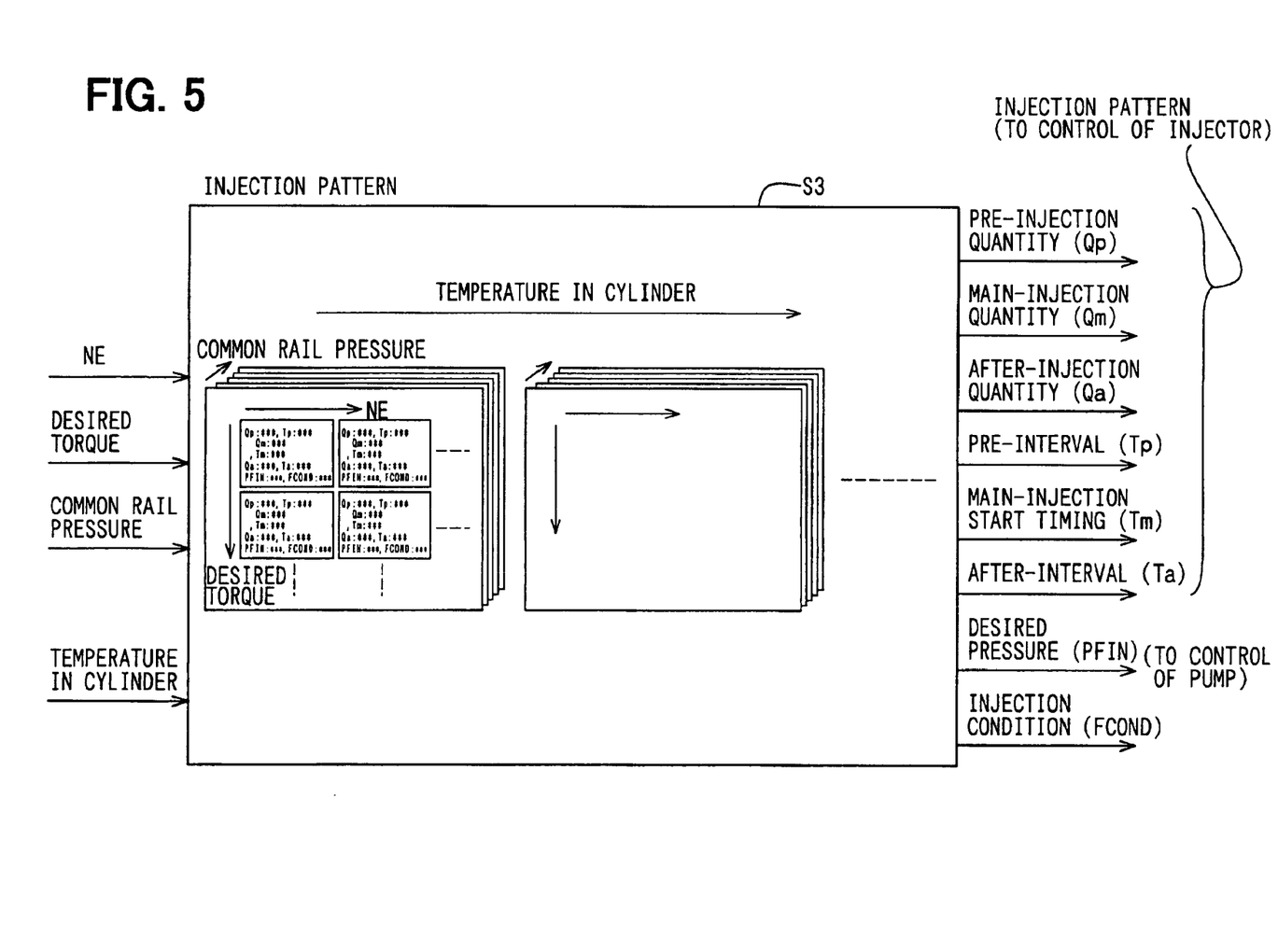
FIG. 5 is a block diagram of injection control according to a second embodiment of the present invention.

In the second embodiment, on the contrary, various injection patterns based on four factors of engine speed, desired torque, common rail pressure, and temperature in a cylinder (compression temperature in a cylinder during non-injection: a cause of atmosphere in the cylinder) are stored in the memory of the ECU 4, as shown in FIG. 5. An injection pattern appropriate to the current engine speed, the desired torque, the common rail pressure, and the temperature in the cylinder is read from the memory during the operation of the engine, and the read injection pattern is carried out. The current temperature in the cylinder is estimated from the intake air temperature detected by a temperature sensor, a compression ratio, and the like, by use of a map or calculation.

In the second embodiment, the injection pattern is determined on the basis of the temperature in the cylinder, which is a cause of the operating state of the engine, in addition to the three factors of engine speed, desired torque, and common rail pressure. Thus, it is possible to closely set the injection pattern appropriate to the operating state of the engine, not only in the regular period but also in the transitional period.

[Third Embodiment]

Figure 6:
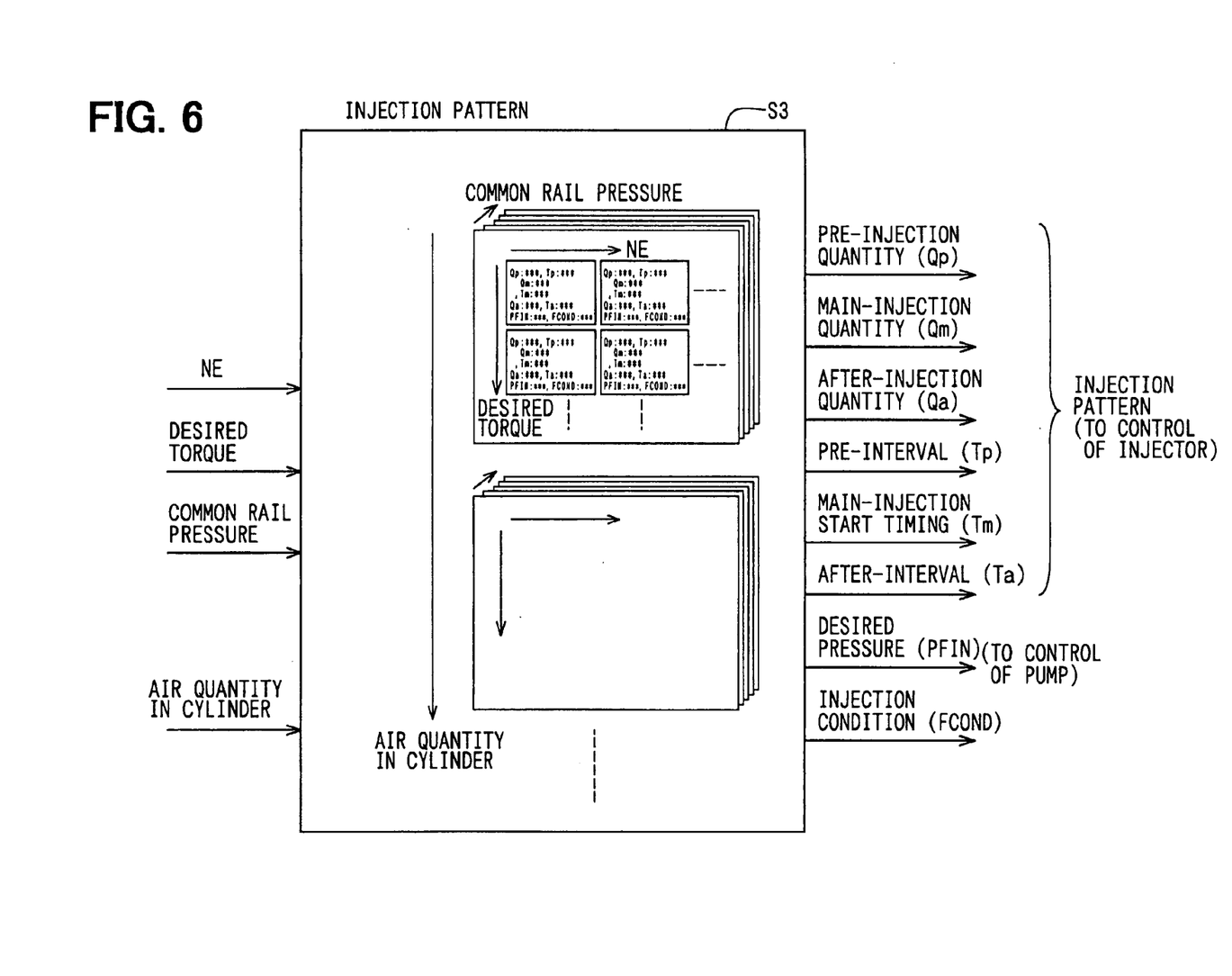
FIG. 6 is a block diagram of injection control according to a third embodiment of the present invention.

In the third embodiment, as shown in FIG. 6, various injection patterns based on four factors of engine speed, desired torque, common rail pressure, and air quantity in a cylinder (pressure in a cylinder during non-injection: a cause of atmosphere in the cylinder) are stored in the memory of the ECU 4. An injection pattern appropriate to the current engine speed, the desired torque, the common rail pressure, and the air quantity in the cylinder is read from the memory during the operation of the engine, and the read injection pattern is carried out. The current air quantity in the cylinder is estimated from an air flow rate detected by an intake air quantity sensor and the like, by use of a map or calculation.

In the third embodiment, the injection pattern is determined on the basis of an air quantity in the cylinder, which is a cause of the operating state of the engine, in addition to the three factors of engine speed, desired torque, and common rail pressure. Thus, it is possible to closely set the injection pattern appropriate to the operating state of the engine, not only in the regular period but also in the transitional period.

[Fourth Embodiment]

Figure 7:
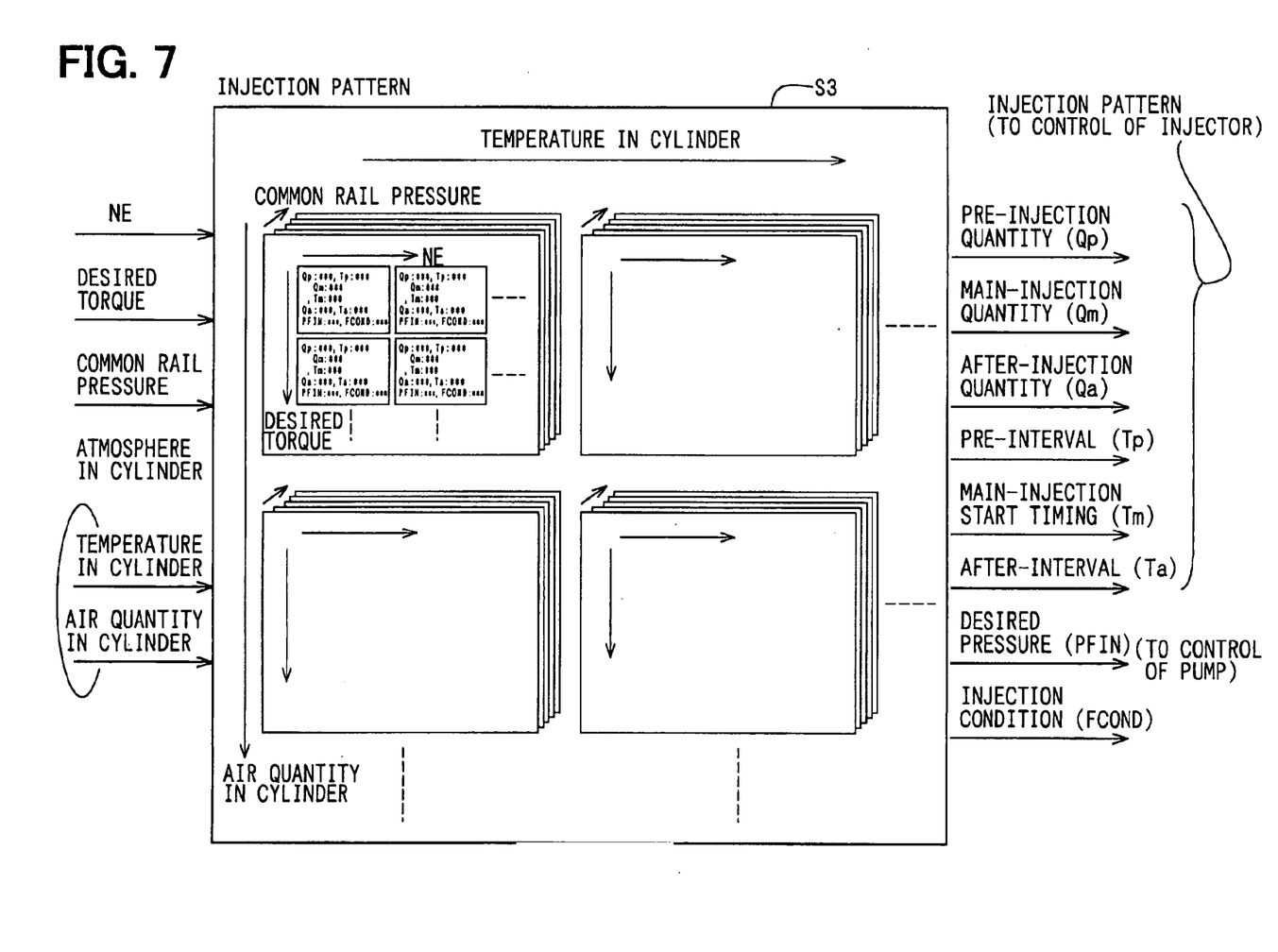
FIG. 7 is a block diagram of injection control according to a fourth embodiment of the present invention.

In the fourth embodiment, as shown in FIG. 7, various injection patterns based on five factors of engine speed, desired torque, common rail pressure, temperature in a cylinder (compression temperature in the cylinder during non-injection), and air quantity in the cylinder (pressure in the cylinder during non-injection) are stored in the memory of the ECU 4. An injection pattern appropriate to the current engine speed, the desired torque, the common rail pressure, the temperature in the cylinder, and the air quantity in the cylinder is read from the memory during the operation of the engine, and the read injection pattern is carried out.

In the fourth embodiment, the injection pattern is determined on the basis of the temperature and the air quantity in the cylinder, which are causes of the operating state of the engine, in addition to the three factors of engine speed, desired torque, and common rail pressure. Thus, it is possible to closely set the injection pattern appropriate to the operating state of the engine, not only in the regular period but also in the transitional period.

[Fifth Embodiment]

In the forgoing first to fourth embodiments, an injection pattern is determined by use of the current common rail pressure, which is detected by the common rail pressure sensor 24.

In this embodiment, however, the injection pressure of the injector 2 is used instead of the common rail pressure. To detect the injection pressure of the injector 2, the upstream pressure of the nozzle seat of the injector 2 may be directly detected by a sensor. Otherwise, the injection pressure of the injector 2 may be estimated from the common rail pressure and the like. The injection pressure of the injector 2 has a direct effect on the characteristics of the engine, as compared with the common rail pressure. Therefore, it is possible to obtain an injection pattern appropriate to the operating state of the engine, by determining the injection pattern with the use of the current injection pressure of the injector 2, instead of the common rail pressure.

[Modification Example]

In the foregoing embodiments, desired torque is used as an example of a desired value of engine power. The desired torque is calculated on the basis of a request (accelerator opening) from a driver in the foregoing embodiments. The present invention is not limited thereto, and the desired torque may be calculated on the basis of a request from a vehicle (for example, an auto cruise function, torque necessary to use the engine power in operation, torque necessary to keep the engine at constant speed and the like).

A power index value (calculated by variation in the operation of accelerator opening), desired injection quantity or the like may be used as the desired value of engine power, in addition to desired torque which is presented in the foregoing embodiments, as long as the desired value of engine power is an index value for indicating a desired level of engine power.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A common rail fuel injection device comprising:
   a memory device for storing various injection patterns, based on an engine speed, desired values of engine power, and a common rail pressure; and
   a control unit for reading an injection pattern, which is appropriate to a current engine speed, a current desired value of engine power, and a current common rail pressure, from said memory, to carry out said read injection pattern.

2. The common rail fuel injection device according to claim 1, wherein
   said memory device stores various injection patterns based on a temperature in a cylinder in addition to said engine speed, said desired values of engine power, and said common rail pressure, and
   said control unit reads an injection pattern appropriate to said current engine speed, said current desired value of engine power, said current common rail pressure, and current temperature in said cylinder, from said memory, to carry out said read injection pattern.

3. The common rail fuel injection device according to claim 1, wherein
   said memory device stores various injection patterns based on an air quantity in a cylinder, and said engine speed, said desired value of engine power, and said common rail pressure, and
   said control unit reads an injection pattern appropriate to said current engine speed, said current desired value of engine power, said current common rail pressure, and current air quantity in said cylinder, from said memory, to carry out said read injection pattern.

4. The common rail fuel injection device according to claim 1, wherein
   said memory stores various injection patterns based on a temperature in a cylinder and an air quantity in said cylinder, in addition to said engine speed, said desired value of engine power, and said common rail pressure, and said control unit reads an injection pattern appropriate to said current engine speed, said current desired value of engine power, said current common rail pressure, a current temperature in said cylinder, and a current air quantity in said cylinder, from said memory, to carry out said read injection pattern.

5. The common rail fuel injection device according to claim 1, wherein when a plurality of injection factors for composing said injection pattern are interpolated on the basis of a current operating state, a single interpolation coefficient is calculated, and interpolation of the plurality of injection factors is carried out with the use of said interpolation coefficient.

6. The common rail fuel injection device according to claim 1, wherein said desired value of engine power is an index value for indicating a desired level of engine power, and said desired value of engine power is one of engine desired torque, a desired injection quantity, and a power index value for indicating a level of power desired by a driver.

7. The common rail fuel injection device according to claim 1, wherein when said common rail pressure is inappropriate to said desired value of engine power, and said desired value of engine power cannot be obtained by carrying out an injection pattern, said control unit informs a driver that actual engine power does not satisfy said desired value of engine power.

8. The common rail fuel injection device according to claim 1, wherein when said common rail pressure is inappropriate to said desired value of engine power, and said desired value of engine power cannot be obtained by carrying out an injection pattern, said control unit outputs a signal to other control units, said signal indicating that the actual engine power does not satisfy said desired value of engine power.

9. The common rail fuel injection device according to claim 1, wherein an injection pressure of an injector is used instead of said common rail pressure.

* * * * *